(12) United States Patent
Azulay

(10) Patent No.: US 6,637,490 B1
(45) Date of Patent: Oct. 28, 2003

(54) ANVIL FOR ULTRASONIC CUTTING APPARATUS

(75) Inventor: Meir Azulay, Misgav (IL)

(73) Assignee: R.M.D. Robotics Ltd., Bnei Brak (IL)

( * ) Notice: Subject to any disclaimer, the term of this patent is extended or adjusted under 35 U.S.C. 154(b) by 35 days.

(21) Appl. No.: 09/709,570

(22) Filed: Nov. 13, 2000

(30) Foreign Application Priority Data

Nov. 11, 1999 (IL) .................................................. 132893

(51) Int. Cl.$^7$ .......................... B32B 31/18; B32B 55/00
(52) U.S. Cl. ..................................... 156/515; 156/580.2
(58) Field of Search .............................. 156/73.1, 73.3, 156/73.4, 379.6, 380.7, 515, 580.1, 580.2; 228/1.1

(56) References Cited

U.S. PATENT DOCUMENTS

| | | | |
|---|---|---|---|
| 4,047,826 A | * | 9/1977 | Bennett ........................ 408/59 |
| 4,542,771 A | | 9/1985 | Payet et al. |
| 4,711,693 A | | 12/1987 | Holze, Jr. |
| 4,949,615 A | * | 8/1990 | Jordan ......................... 83/343 |
| 5,931,367 A | | 8/1999 | Sato et al. |
| 5,934,043 A | * | 8/1999 | Aindow et al. ............ 53/371.4 |

FOREIGN PATENT DOCUMENTS

| | | |
|---|---|---|
| DE | 36 05 363 A | 8/1987 |
| DE | 87 09 481 U | 9/1987 |
| FR | 2 086 600 A | 12/1971 |

* cited by examiner

Primary Examiner—Richard Crispino
Assistant Examiner—Sing P Chan
(74) Attorney, Agent, or Firm—Oliff & Berridge

(57) ABSTRACT

According to the present invention there is provided an anvil assembly adapted for selective cooperation with a horn operatively connected to an ultrasonic wave generator such as to enable a textile workpiece disposed between the horn and the anvil assembly to be cut with the cut and simultaneously sealed. The anvil assembly comprises an anvil and a cradle, the anvil adapted to be selectively mounted onto the cradle in any one of at least two mounting positions, wherein corresponding to each mounting position the anvil comprises one peaked longitudinal cutting edge and a corresponding engagement section parallel to a longitudinal axis of the anvil. The corresponding positioning and engagement section is adapted for selective engagement for removably positioning and locked onto the cradle.

22 Claims, 9 Drawing Sheets

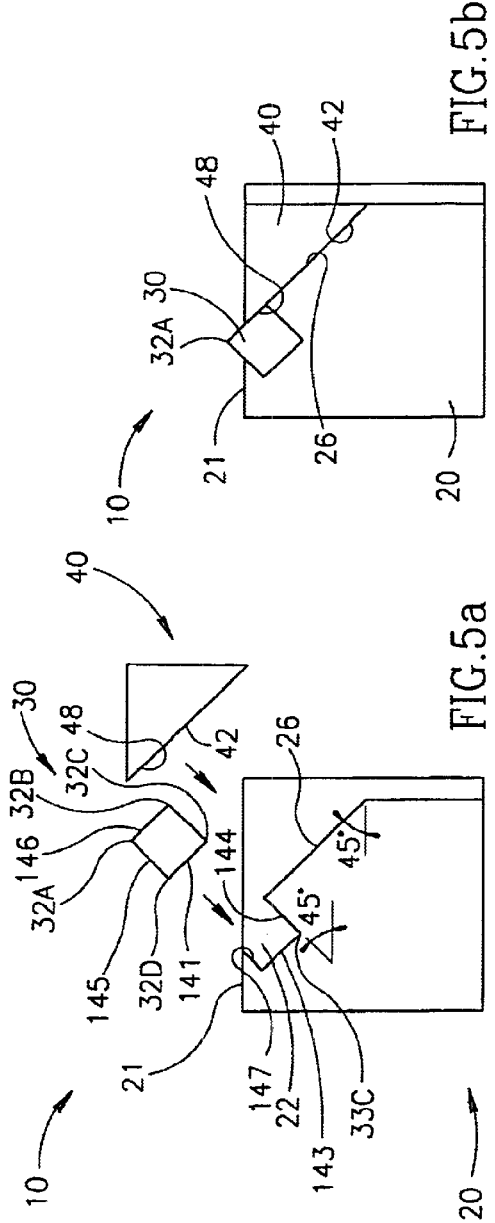
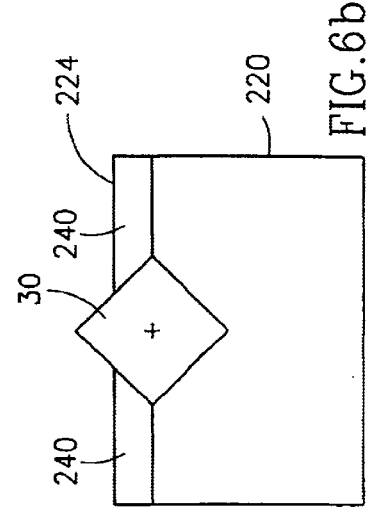
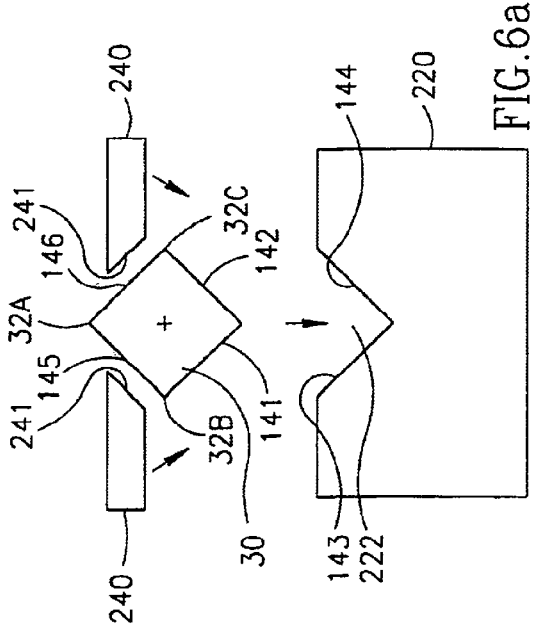
FIG.5a
FIG.5b
FIG.6a
FIG.6b

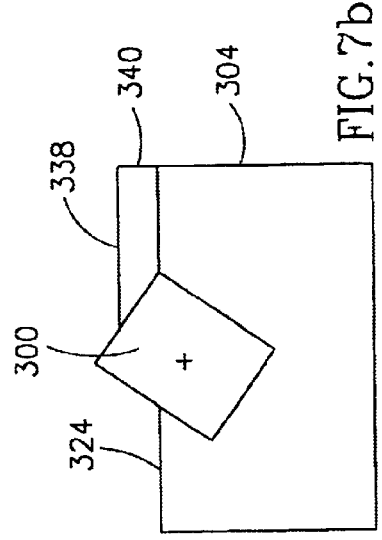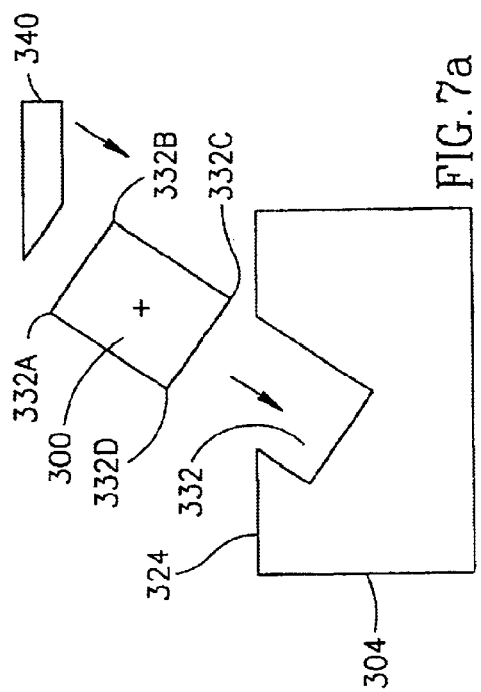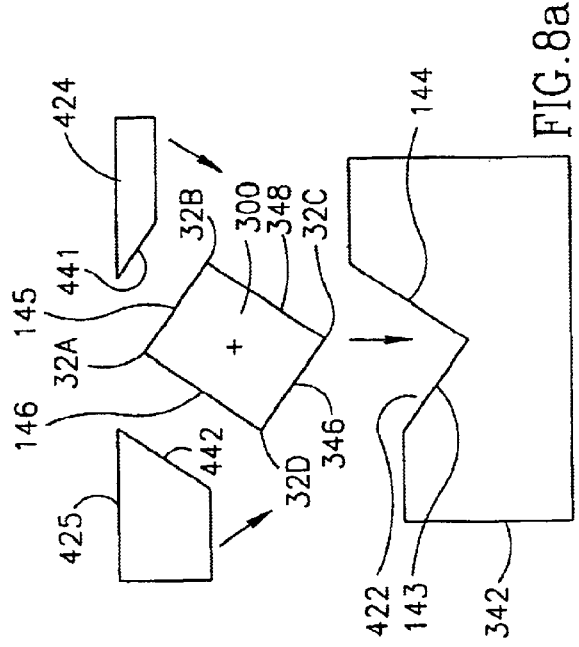

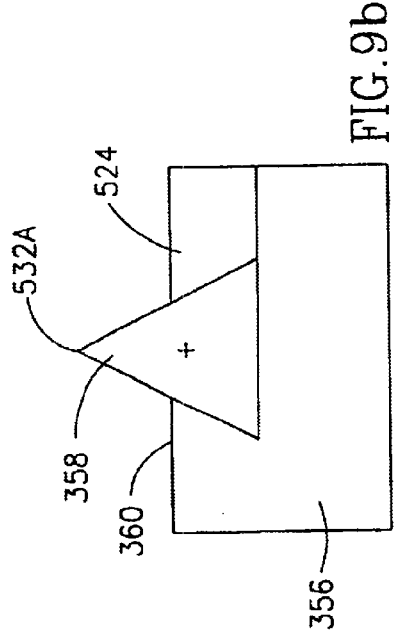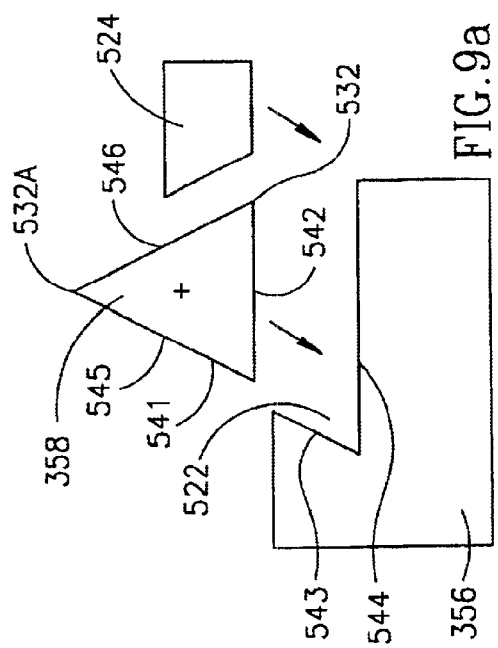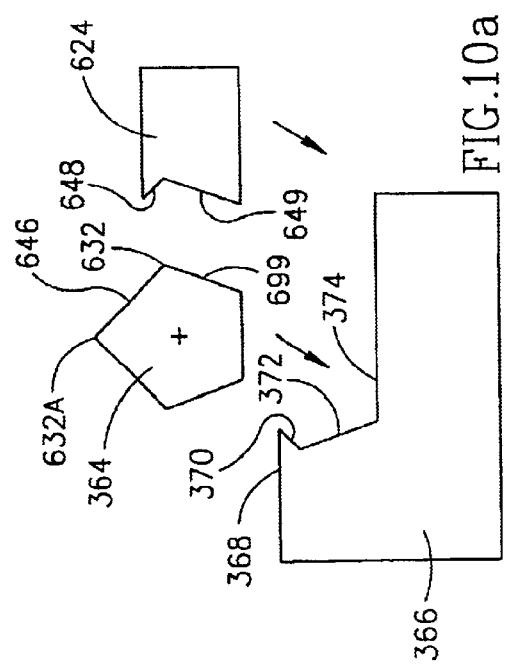

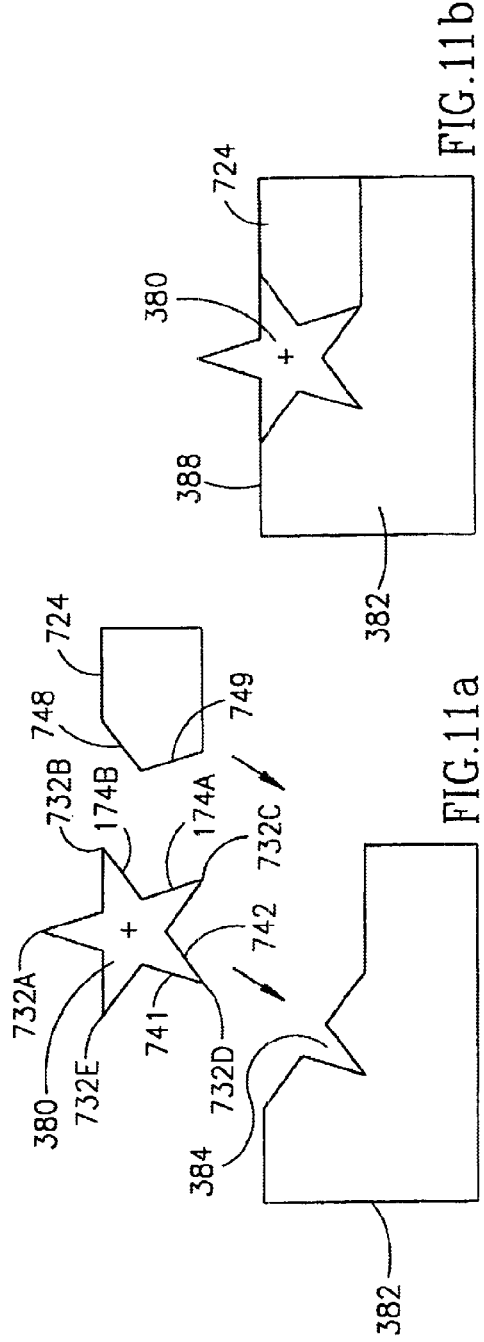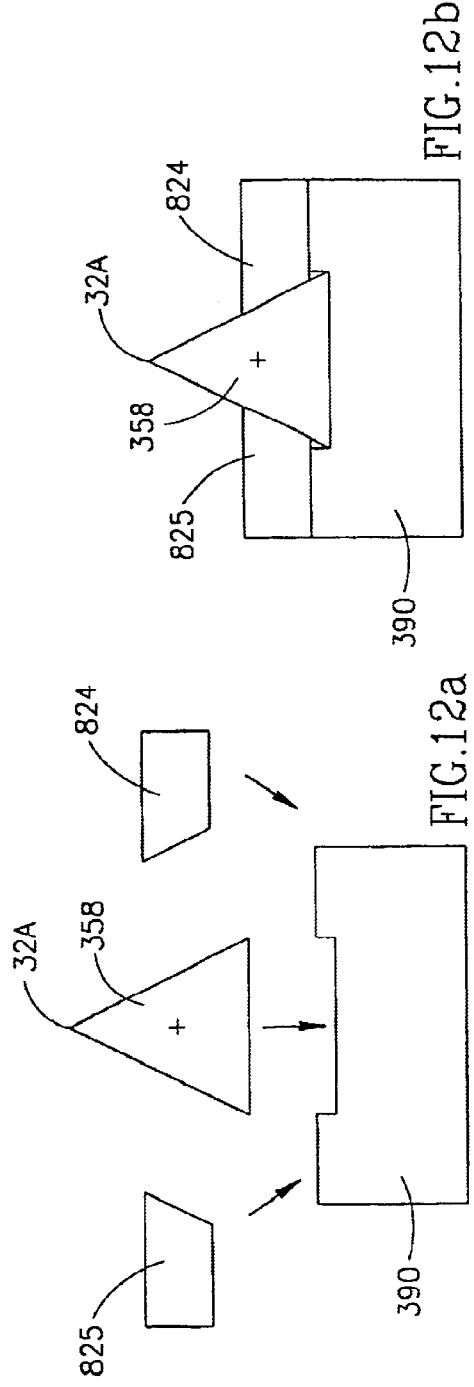

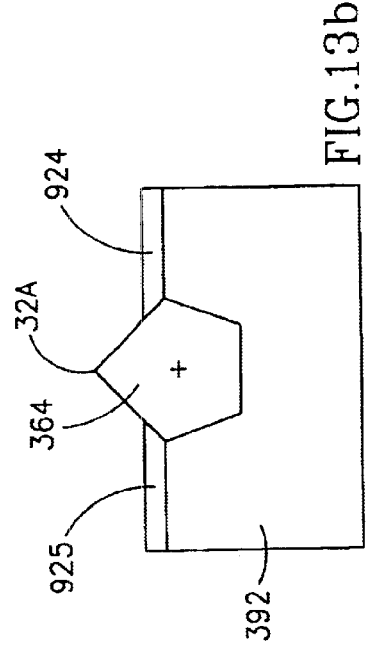
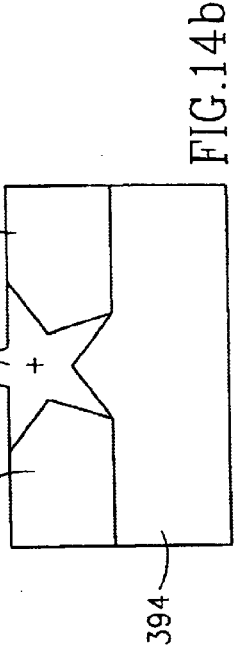
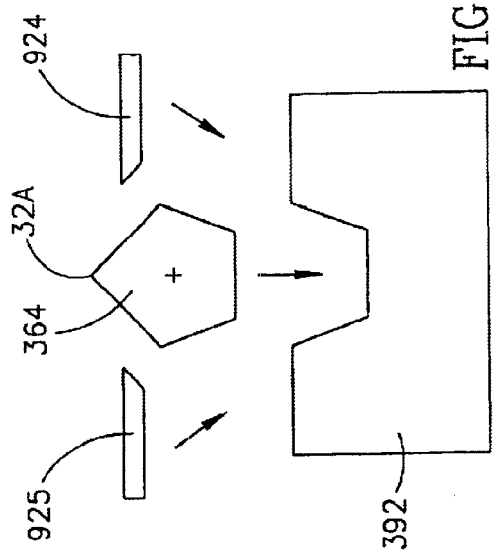
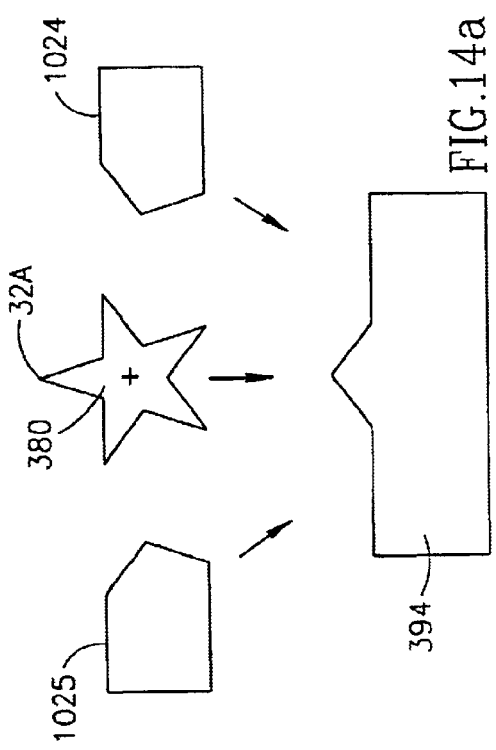

ANVIL FOR ULTRASONIC CUTTING APPARATUS

FIELD OF THE INVENTION

The present invention relates to a textile-cutting device, in particular for cutting and sealing textile tape, and more specifically with reference to an anvil construction for an ultrasonic cutting apparatus.

BACKGROUND OF THE INVENTION

The use of ultrasonic energy for cutting and slitting textile material is well known. Textile cutters employing ultrasonic energy provide a sealed (welded/fused) edge as it is being cut, thereby preventing the unraveling of threads or the appearance of a frayed edge, and is thus preferred over conventional cutters in a host of applications.

Typically, an ultrasonic wave generator comprises a horn, which is vibrated by the generator against the peaked cutting edge of an anvil, thereby cutting a strip of material disposed therebetween. Such textile material is either thermoplastic or comprises a thermoplastic fiber content. As an example, in one such application, a roll of continuous printed labels is cut into individual labels using ultrasonic energy prior to stitching the cut labels onto garments. Optionally each label may be folded in two prior to being stitched to the garment, or, alternatively, the label strip may be folded just prior to the cutting operation such that as each label is cut, the upstream and downstream cut edges are fused together.

As the horn is vibrated against the anvil, for example at a frequency of about 30 to about 40 KHz, the horn undergoes at its output surface a small translation in peak-to-peak amplitude. At these conditions, large acceleration forces (typically of the order of several thousand g) are induced, and corresponding forces cause the horn, which is urged against the anvil, to be repetitively impacted and driven away from the anvil, thereby enabling a strip of material to be cut when disposed in-between the anvil and the horn. The anvil is thus subjected to severe vibration and impact forces, particularly on the edge thereof, which thus becomes worn rather quickly with use.

In prior art devices, the rapid wearing of the anvil has hitherto necessitated the anvil to be regularly replaced, a complex and costly procedure requiring the cutting apparatus to be disassembled and reassembled with a new anvil, with the ensuing down time and loss of production time, and associated costs including that of the new anvil.

It is therefore an aim of the present invention to provide a textile cutting device that overcomes or significantly reduces the limitations of prior art ultrasonic cutting devices.

It is also an aim of the present invention to provide an anvil construction comprising a cradle and a replaceable anvil lockable with respect thereto that enables the cradle to be mounted to the ultrasonic cutting apparatus, while allowing for simple replacement of the anvil whenever needed.

SUMMARY OF THE INVENTION

The present invention provides an anvil conduction comprising an anvil lockably mountable onto a cradle in one of at least two interchangeable mounting positions. Corresponding to each mounting position, the anvil has at least one longitudinal cutting edge and a corresponding engagement section for engagement with a complementary engagement means formed in the cradle.

According to the present invention there is provided an anvil assembly adapted for selective cooperation with a horn operatively connected to an ultrasonic wave generator such as to enable a textile workpiece disposed between said horn and said anvil assembly to be cut wit the cut and simultaneously sealed. The anvil assembly comprises an anvil and a cradle, said anvil adapted to be selectively mounted onto the cradle in any one of at least two mounting positions, wherein corresponding to each said mounting position said anvil comprises one peaked longitudinal cutting edge and a corresponding engagement section substantially parallel to a longitudinal axis of the anvil; said corresponding positioning and engagement section adapted for selective engagement with a complementary engagement means enabling said anvil assembly to be removably positioned and locked onto said cradle in a corresponding one of said at least two mounting positions such as to enable said peaked edge corresponding to said one of said at least two mounting positions to protrude from said cradle.

Typically, the engagement means comprise at least one abutment member which abuts the anvil against a complementary engaging surface of the cradle. The engagement surface may be in the form of a receptacle or a projection, formed of one or more wall portions, which together with the abutment member provide positioning and fixation means. Thus, the anvil may be easily positioned on the cradle without having to remove the cradle from the ultrasonic cutting apparatus, rendering replacement of the anvil assembly of the cutting apparatus a straightforward operation. The anvil itself may therefore be a simple component that is relatively inexpensive to manufacture.

In the preferred embodiment the anvil is in the form of an elongate prism-like member having a nominally constant transverse cross-sectional profile along its longitudinal axis, and comprising a plurality of longitudinal cutting edges, angularly spaced one from another with respect to the longitudinal axis of the anvil. The prism-like member is locked onto the cradle by means of said engagement means, in any one of a plurality of angular positions, the number of angular positions being correlated to the number of parallel edges of the prism such that in each position one cutting edge is in turn brought into registry with the horn of the ultrasonic generator. Thus, as one edge becomes worn and unusable, the prism is removed from the cradle, rotated about its axis and replaced in the cradle such that a new edge is aligned with the horn.

The anvil according to the present invention may also be designed for incorporation in a cradle that is retrofittable with respect to existing ultrasonic cutting machines.

Furthermore, it is also possible to double the useful life of the anvil by aligning the horn with one longitudinal half of the anvil, rather than the center section thereof. Thus, following the aforementioned procedure, only up to one half of each edge gets worn in turn. By removing the anvil from the cradle and turning it by 180° about a vertical or horizontal plane comprising the axis of the anvil, the unused half of each edge may in turn be brought into registry with the horn.

BRIEF DESCRIPTION OF THE DRAWINGS

In order to understand the invention and to see how it may be carried out in practice, a preferred embodiment will now be described by way of non-limiting example only, with reference to the accompanying drawings, in which:

FIG. 5 is a side elevational cross-sectional view of the embodiment of FIG. 3, along line Y—Y in FIG. 1: disassembled in FIG. 5(a); assembled in FIG. (5b);

FIG. 6 is a side elevational cross-sectional view, of a second embodiment, along line Y—Y in FIG. 1: disassembled in FIG. 6(a); assembled in FIG. 6(b);

FIG. 7 is a side elevational cross-sectional view, of a third embodiment, along line Y—Y in FIG. 1: disassembled in FIG. 7(a); assembled in FIG. 7(b);

FIG. 8 is a side elevational cross-sectional views, of a fourth embodiment, along line Y—Y of FIG. 1: disassembled in FIG. 8(a); assembled in FIG. 8(b);

FIG. 9 is a side elevational cross-sectional view, of a fifth embodiment, along line Y—Y in FIG. 1: disassembled in FIG. 9(a); assembled in FIG. 9(b);

FIG. 10 is a side elevational cross-sectional view, of a sixth embodiment, along line Y—Y in FIG. 1: disassembled in FIG. 10(a); assembled in FIG. 10(b);

FIG. 11 is a side elevational cross-sectional view, of a seventh embodiment along line Y—Y in FIG. 1: disassembled in FIG. 11(a); assembled in FIG. 11(b);

FIG. 12 is a side elevational cross-sectional view, of an eighth embodiment along line Y—Y in FIG. 1: disassembled in FIG. 12(a); assembled in FIG. 12(b);

FIG. 13 is a side elevational cross-sectional view, of a ninth embodiment along line Y—Y in FIG. 1: disassembled in FIG. 13(a); assembled in FIG. 13(b); and FIG. 14 is a side elevational cross-sectional view, of a tenth embodiment along Y—Y in FIG. 1: disassembled in FIG. 14(a); assembled in FIG. 14(b).

DETAILED DESCRIPTION OF SPECIFIC EMBODIMENTS

Figure 1:
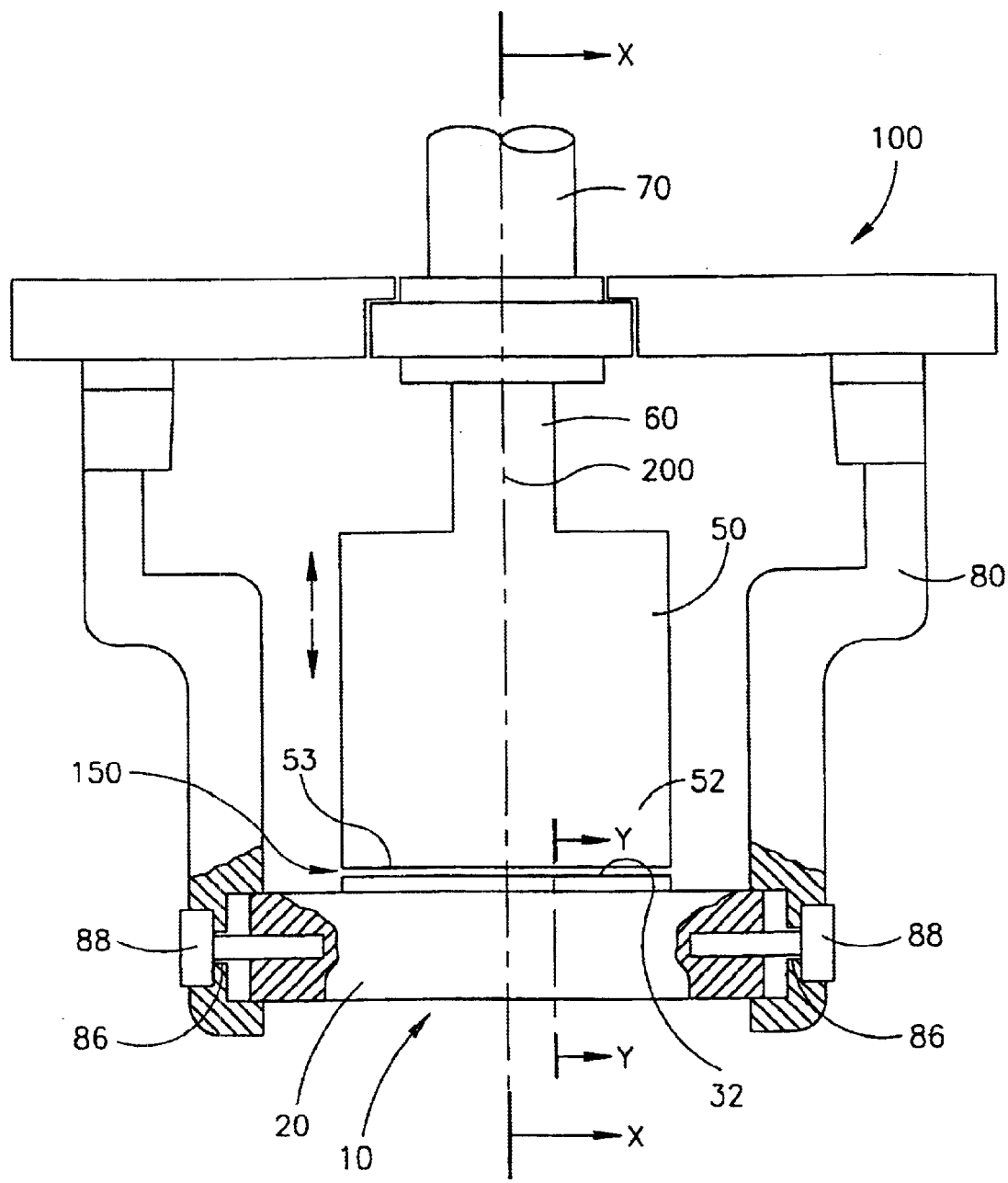
FIG. 1 is a front partial cross-sectional view, of an embodiment of the present invention mounted in an ultrasonic cutting apparatus.
Figure 2:
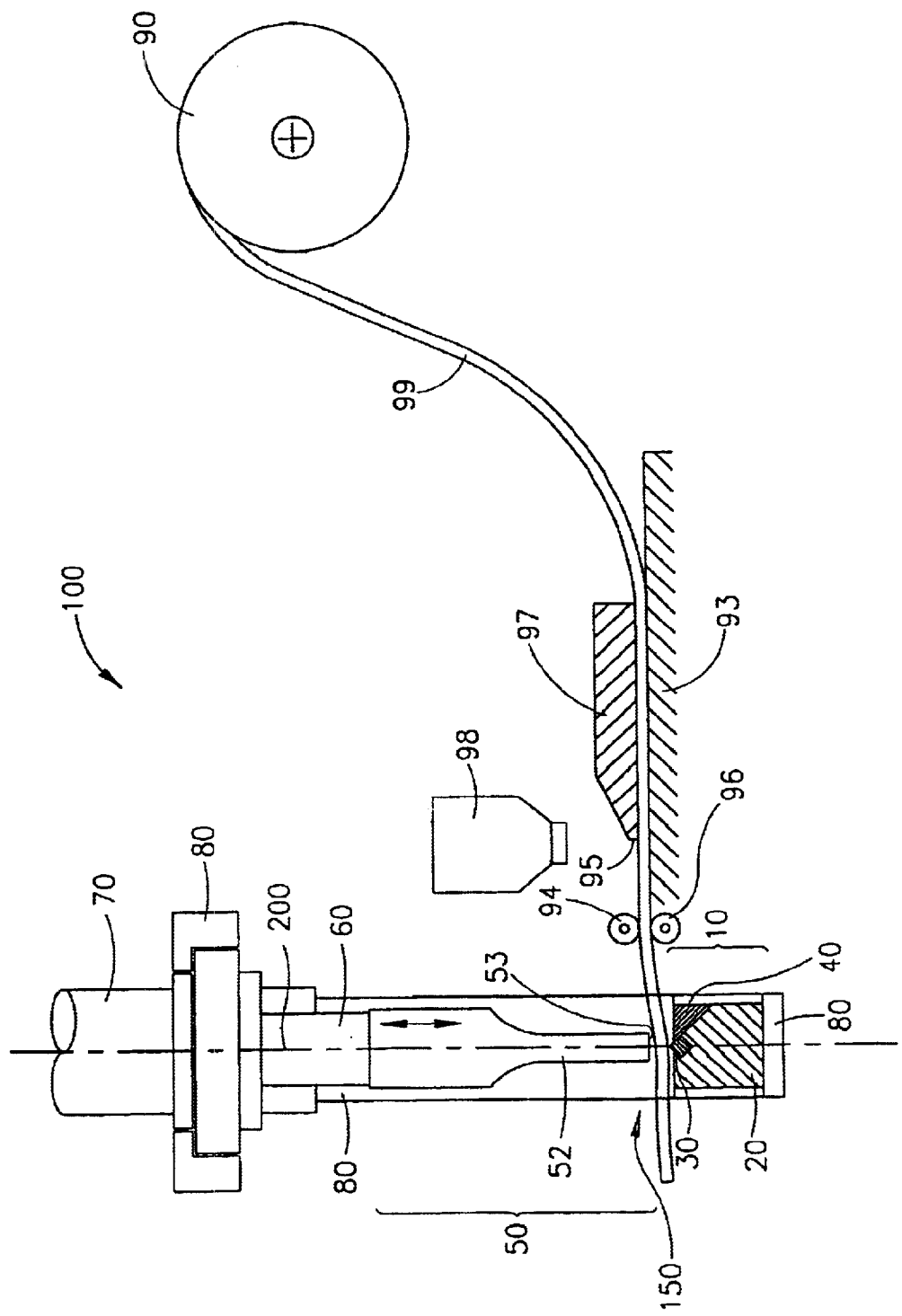
FIG. 2 is a side elevational cross-sectional view, of the apparatus of FIG. 1 along line X—X.

Referring to FIGS. 1 and 2, there is illustrate a typical ultrasonic cutting apparatus comprising an anvil assembly of the present invention. The ultrasonic tape cutting apparatus, generally designated 100, comprises an anvil assembly generally designated 10, vertically aligned with horn 52 of an ultrasonic wave generator 50. The generator 50 is carried on a shaft 60 that is reciprocally shiftable along the axis 200 thereof, by any suitable mean such as a pneumatic actuator 70 or the like. The actuator 70 and the anvil assembly 10 are mounted at opposed ends of a support fame 80 such that, as the actuator 70 is actuated, the horn 50 may be selectively brought into contact with ad separated from the anvil assembly 10 as desired, in particular with the respect to the protruding cutting edge 32 thereof, as will be described hereinafter.

A roll 90 (FIG. 2) holds a continuous textile strip 99, comprising, for example pre-printed labels for clothing, is fed to the device 100 by upstream parallel feed rollers 94 and 96. An optical scanner 98 scans the strip 99 as it passes the downstream edge 95 of a presser plate 97, which maintains the strip 99 flat and pressed against the table 93. The scanner 98 is operatively connected to a controller (not shown), typically a microprocessor, and enables the tape 99 to be fed in a synchronized manner to the cutting station 150 of the device 100, such that strip 99 is cut into individual labels at the correct upstream and downstream portions of each label. The cutting apparatus 100 may optionally further comprise folding means to fold each portion of the strip 99 corresponding to an individual label into two, prior to the same being cut, such that the upstream and downstream edges of each individual label are fused together as it is cut from the strip 99. Such folding means are known in the art. Alternatively, each individual label may be folded in two after the cutting operation, in a separate folding operation downstream thereof, prior to, or in conjunction with stitching of the label to a garment.

Figure 3:
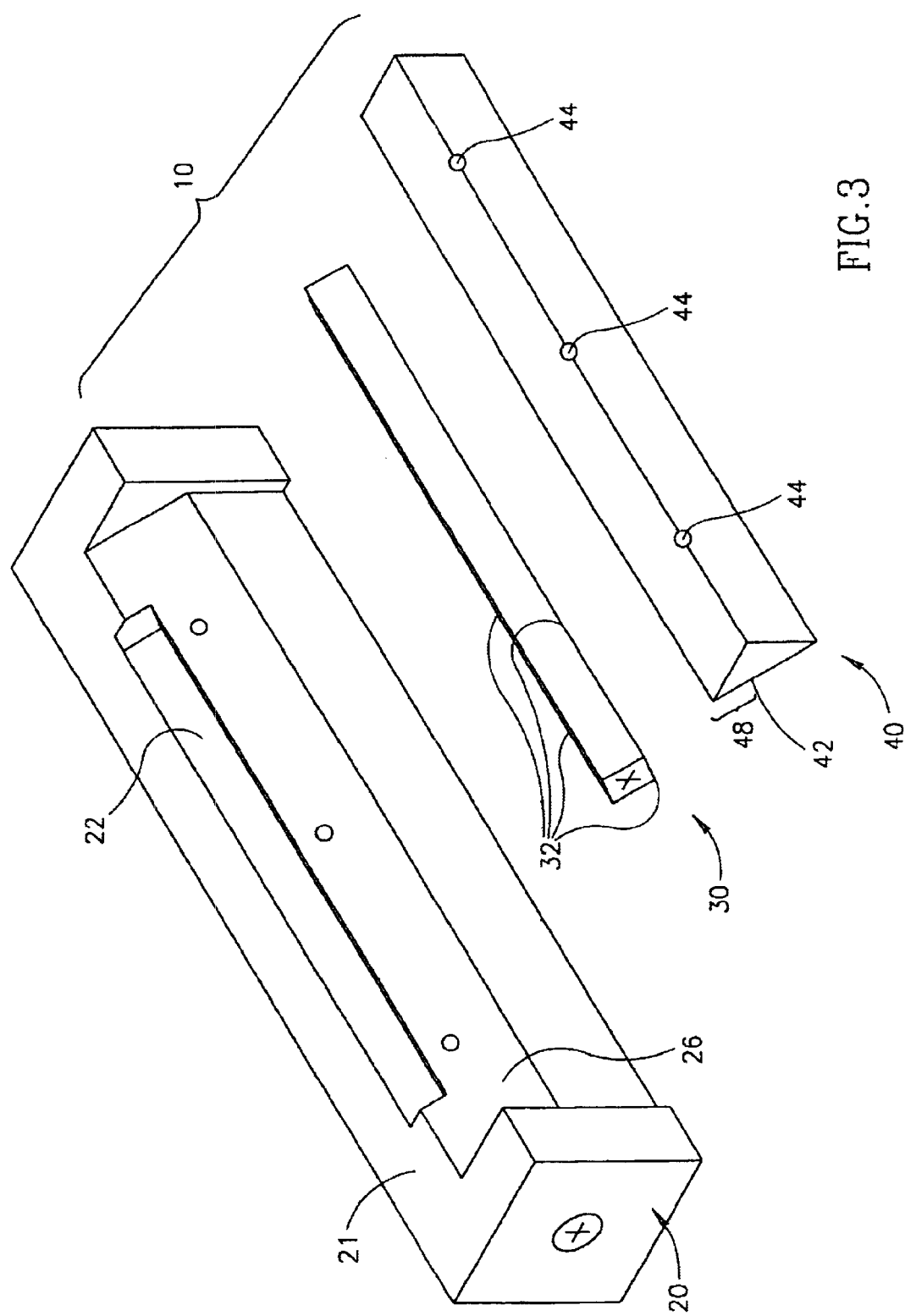
FIG. 3 is a perspective exploded view of an embodiment of the present invention.
Figure 4:
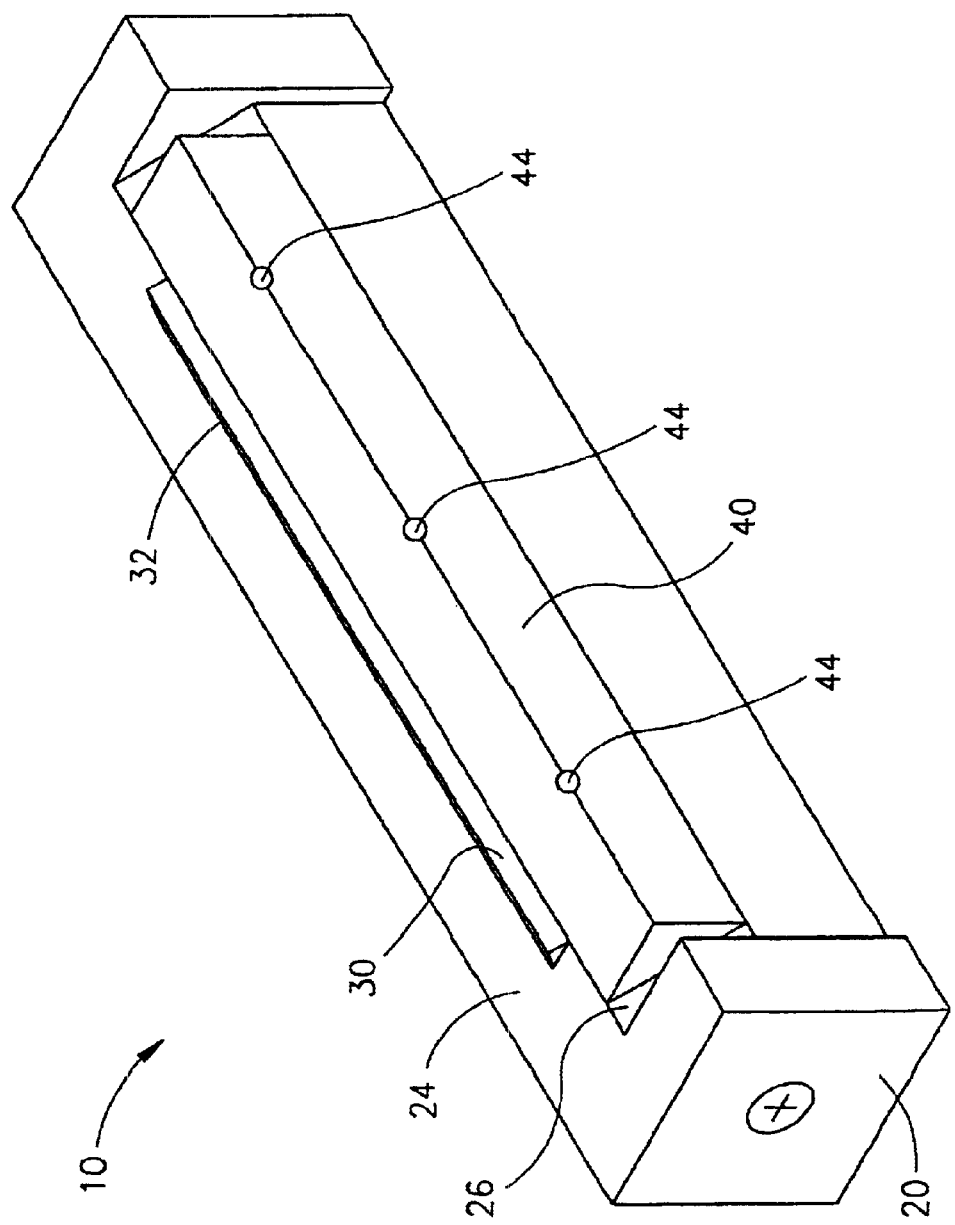
FIG. 4 is a perspective view of the embodiment of FIG. 3, assembled.

With further reference being made now to FIGS. 3 to 5, a preferred embodiment of the anvil assembly 10 comprises a longitudinal cradle 20 which replaceably support the anvil in its respective operative positions, as will become apparent hereinafter. The cradle 20 is formed with an engagement means, which in the present embodiment is in the form of a receptacle recess or longitudinal slot 22 along at least part of its axial or longitudinal length on the upper surface 21 of the cradle 20. The slot 22 is adapted for laterally receiving and engaging an anvil 30. The anvil 30 has, in the preferred embodiment, a square cross-sectional transverse profile, with four longitudinal parallel peaked cutting edges 32, each edge 32 angularly arranged at 90° with respect to adjacent edges 32. In this case, the slot 22 has a rectangular transverse profile, having sides angled at 45° to the upper surface 21 of the cradle 20, as illustrated in FIG. 3 and FIG. 5.

Thus, as also seen in FIG. 5a, the anvil 30 may be laterally received into said slot 22 in any one of four mounting positions of the anvil 30. The mounting positions are angularly displaced one from another along planes perpendicular to the longitudinal axis of the anvil 30. In each mounting position of the anvil 30, one of the said four edges 32, say edge 32A (see FIG. 5a), protrudes from the upper surface 21 of the cradle 20, and surfaces 141 and 142 of the anvil 30, extend in respective opposite directions from another edge 32C disposed at 180° from said edge 32A. The surfaces 141 and 142, respectively abut against complementary respective abutment walls 143 and 144 which extend in respective opposite directions from a longitudinal common convex edge 33C of the slot 22 to enable the anvil 30 to be positioned and engaged in the slot 22. Said surfaces 143 and 144 are disposed at about 45° with respect to the upper surface 21 of the cradle 20. Surfaces 145 and 146 extend in respective opposite to directions from the peaked edge 32A. In this embodiment, the receptacle slot 22 further comprises a longitudinal surface 147 adapted for abutment against a respective surface 145 the said anvil 30.

The cradle 20 further comprises a surface 26 angled with respect to the upper surface 21 of cradle 20 such that it is coplanar with the longitudinal planar surfaces 146, of the anvil 20 when received within slot 22.

The anvil 30 is positioned and locked in the slot 22 by locking bracket 40 formed in a generally prismatic shape, having a substantially triangular transverse profile, which when assembled has at least one substantially planar wall 42 extending axially in parallel arrangement to said slot 22. The wall 42 of the bracket 40 comprises at a longitudinal portion 48 adapted for abutting against a longitudinal portion of wall 146 of the anvil 30. Thus, in the present embodiment, surfaces 48 is at about 45° to the upper surface 21, and the bracket 40 is secured to the cradle 20 by any suitable means such as bolts 44 (FIG. 3) or the like, such that with at least part of surface 26 being in contact with wall 42, portion 48 of said wall 42 secures and locks the anvil 30 within the slot 22. However, it is appreciated that the bracket 40 may be secured in its abutting position also by suitable clamping means, as known per se.

When the protruding cutting edge 32A becomes worn, the anvil 30 may be removed from the slot turned by 90° or multiple thereof about its longitudinal axis, and reinserted into the slot 22 such that a different edge 32 now becomes the protruding, active edge.

In a second embodiment of the present invention, illustrated in FIGS. 6a and 6b, the cradle 220 comprises a V-shaped slot 222, formed of surfaces 143 and 144 preferably extending in a lateral direction to a similar extent as the surfaces 141 and 142 of the anvil 30. Nonetheless, ices 143 and 144, respectively may extend in a lateral direction to a lesser or to a greater extent as the surfaces 141 and 142, respectively, in which case the upper surface 224 of the cradle 220 would be lower or higher, respectively, than the lateral edges indicated at 32B and 32D of the anvil 30, in FIGS. 6a and 6b. Anvil 30 is placed and locked onto the cradle 220 by two brackets 240 in parallel arrangement disposed on either side of the anvil 30. Each bracket 240 comprises a surface 241 for abutting against corresponding surfaces 145 and 146, of the anvil 30. The brackets are secured to the anvil by suitable bolts, not shown.

Thus, as one of the four parallel edges 32 of anvil 30 becomes worn, the two locking brackets 240 may be removed from the cradle 20, and the anvil 30 may then be extracted from the slot 222, turned about its axis by 90° or 180° or 270°, and reinserted into the slot 222, such as to expose a different edge 32 protruding on upper surface 224.

As has been described herein the anvil 30 of the first and second embodiment comprises a substantially square transverse cross-section, having four planes of symmetry parallel to the axis of the anvil 30. Nonetheless, it is also possible to have a substantially rectangular cross-sectional profile, with planes of symmetry, in which case such an anvil only has two mounting positions with respect to the second engagement means.

Similarly, the said anvil may comprise a cross-sectional shape having no planes of symmetry, for example a parallelepiped having one pair of opposed sides smaller than the second pair of opposed sides, with one pair of opposed angles being acute, while the other pair of opposed angles being obtuse. in a third embodiment of the present invention, illustrated in. FIGS. 7a and 7b, the anvil 300 has a transverse cross-section in the shape of a non-symmetrical parallelogram instead of a square as in the previous embodiments. In this embodiment, the anvil 300 can be selectively mounted onto the cradle 304 in any one of only two positions, enabling one or other of the acute edges 332A or 332C to protrude from the upper surface 324 of the cradle 20. Nonetheless, by rotating the anvil 300 by 180° about an axis perpendicular to its longitudinal axis, either one of the obtuse edges 332B or 332D my be configured to protrude from upper surface 338. In this embodiment, a single bracket 340 releasably locks the anvil 300 in position in the cradle 304, such that an edge 332A protrudes from an upper surface 338 of bracket 340.

In the embodiment of FIGS. 8a and 8b the same anvil 300 as in the embodiment of FIG. 7 is used. In this embodiment engagement means of the cradle 342 comprises a V-shaped slot 422, comprising surfaces 143 and 144 which in his embodiment are of different transverse lengths but extend in a lateral direction to a similar extent as the surfaces 346 and 348, respectively, of the anvil 300. The anvil 300 is lockable in the receptacle slot 422 by two brackets 424 and 425 in parallel arrangement disposed on either side of the anvil 300.

Each bracket comprises a surface 441 and 442, respectively for abutting against surfaces 145 and 146, of the anvil 300 for looking the anvil 300 in place when the same is engaged in the cradle 342. In the assembled position, edge 32A protrudes from equi-leveled upper surfaces 350 and 352 of brackets 474 and 425, respectively.

According to an alterative, the anvil may have a regular convex polygonal or star-shaped transverse profile comprising a plurality, say "n", substantially identical vertices, with a corresponding receptacle slot adapted to receive the anvil in any one of "n" positions, wherein each position is augularly displaced from adjacent positions by 360°/n. In other embodiments wherein the anvil comprises "n" vertices, the cutting edge may be replaced n times using a similar procedure to that described for the preferred embodiment, mutatis mutandis.

Thus, for example, a fifth embodiment of the present invention, illustrated in FIGS. 9a and 9b, comprises the same structural elements as the previous embodiments, with the difference that the anvil 358 has a transverse cross-section in the shape of an equilateral triangle instead of a square, and thus comprises three longitudinal cutting edges 532. In this embodiment, the engagement means is in the shape of a V-shaped slot 522 complementary to surfaces 541 and 542 of the anvil 358. A bracket 524 releasably locks the anvil 358 in position in the cradle 356 with an edge 532A protruding from a top surface 36 of the cradle 356, which in the present example, surface 360 is equi-leveled with a corresponding top surface 362 of bracket 524.

In the embodiment illustrated in FIGS. 10a and 10b the anvil 380 has a transverse cross.section in the shape of regular pentagon, and thus corns five longitudinal cutting edges 632, wit one of these edges 632, say edge 632A, protruding from a top surface 368 of the cradle 366. In this embodiment, a bracket 624 comprises two engaging/abutting surfaces 648 and 649 to lock the anvil in place by pressing against the corresponding surfaces 646 and 699, respectively of the anvil and respective surfaces 372, 374 and 376 of the cradle 366, forming together the engagement means.

FIGS. 11a and 11b illustrate still a further embodiment in which the anvil 380 has a transverse cross-section in the shape of regular five pointed star, and thus comprises five longitudinal cutting edges 732A to 732E, with one of these edges 732, say edge 732A, protruding from the cradle 382. The engagement means comprises a V-shaped slot 384 formed on an inclined surface 386, complementary to surfaces 741, 742 respectively, which are comprised on the fourth edge 732D clockwise from the protruding edge 732A as illustrated in FIG. 11a. In this embodiment, the bracket 724 comprises surfaces abutting 748 and 749 complementary to surfaces 174B and 174A to lock the anvil 380 in said cradle 20, such that edge 732A protrudes from an upper surface 388 of the cradle 382.

Alternatively, as illustrated in FIGS. 12, 13 and 14, each of the embodiments of anvils respectively illustrated in FIGS. 9, 10 and 11 may be configured with two locking brackets, rather than a single locking bracket, in a similar manner to that described herein with reference to the fit and second embodiments, mutatis mutandis. Namely, in the embodiment of FIGS. 12a and 12b the anvil 358 is fixed to the cradle 390 by two abutting brackets 824 and 825; in the embodiment of FIGS. 13a and 13b the anvil 364 is fixed to the cradle 392 by two abutting brackets 924 and 925; and in the embodiment of FIGS. 14a and 14b the anvil 380 is fixed to the cradle 394 by two abutting brackets 1024 and 1025, respectively.

In all embodiments of the present invention the horn 52 may be arranged to be in registry with a longitudinal portion of the anvil extending between one end thereof and the middle of its longitudinal length. Thus, in use, only up to half of the longitudinal length of the protruding cutting edge 32A is actually worn, leaving a second half of the edge relatively intact. The same would apply to all of the edges 32 of an anvil, as each one in turn becomes the protruding edge 32A. However, with such an arrangement, it is also possible double the useful life of the anvil by removing the anvil from the cradle, turn it by 180° about a plane that vertically or horizontally intersects the axis of the anvil, and remounting the same in the cradle. In this way, the "unused" half of each cutting edge may be, in turn brought into registry with the horn 52. In this manner, it is also possible to enable anvils having a single plane of symmetry, for example comprising a transverse cross-sectional profile of an isosceles triangle or of a trapezium, to be used in two mounting positions.

Thus, with reference to the fast embodiment of the present invention, the anvil assembly 10 is assembled by laterally inserting anvil 30 into slot 22 of the cradle 20, and secured and locked therein by means of bracket 40, allowing one edge 32 to protrude with respect to upper surface 21. The anvil assembly 10 is then mounted onto the frame 80 by suitable means such as screws 88, such that the edge 32, preferably only up to half the longitudinal length thereof, is vertically aligned with the impact surface 53 of horn 52. Slots 86 may be suitable shaped such as to allow some aligning adjustments of the cradle 20 to be made with respect to frame 80, particularly when part of the exposed edge 32 becomes worn and goes out of alignment with respect to impact surface 53, Actor 70 retracts the horn 52 from the edge 32 leaving a suitable clearance therebetween at the cutting station 150, such that the rollers 92, 94 may advance a suitable length of strip 99 past the cutting station 150, corresponding to an individual label The actuator 70 then urges the horn 52 towards the edge 32 such as to sandwich therebetween a portion of the strip 99, and the ultrasonic wave generator 50 then vibrates the horn 52 against the edge 32 severing the strip 99 thereat and thereby cutting an individual label, and eventually bringing the horn 52 into contact with the anvil assembly 10. Typically, contact between the horn and the anvil completes an electrical circuit, which is set up to enable the actuator 70 to retract the horn 52 from the edge 32 at that point thereby breaking the circuit, in which case the anvil assembly 10 is electrically insulated from the fame 80 at its mutual mounting point. The breaking of the circuit enables another length of tape 99 to be advanced past the cutting station 150, and the horn 52 is again brought into contact with a new part of the tape. This procedure is repeated for each individual label cut by the cutting apparatus 100. Obviously, the same arrangement applies for the other embodiments, mutatis mutandis.

While the description hereinabove describes in detail a few specific embodiments of the invention, it will be understood by those skilled in the art that the invention is not limited thereto and that other variations in form and details may be possible without departing from the scope and spirit of the invention herein disclosed.

What is claimed is:

1. An anvil assembly for use in an ultrasonic cutting apparatus, said assembly is designed for selective cooperation with a horn operatively connected to an ultrasonic wave generator capable to impart to the horn reciprocating movement and to enable a textile workpiece disposed between said horn and said anvil assembly to be cut and the cut edges to be sealed, said anvil assembly characterized in comprising:

an anvil and a stationary cradle, said anvil adapted to be indexably mountable onto the cradle in any one of at least two mounting positions, wherein corresponding to each mounting position said anvil comprises one peaked longitudinal rectilinear cutting edge and a corresponding engagement section substantially parallel to a longitudinal axis of the anvil; said corresponding engagement section is selectively engageable with a complementary engagement means formed in the cradle for enabling the anvil to be removably locked onto the cradle in a corresponding one of said at least two mounting positions such that the peaked edge corresponding to one of said at least two mounting positions protrudes from the cradle.

2. An anvil assembly according to claim 1, wherein the cutting edges of the anvil are angularly displaced one from another along planes perpendicular to the longitudinal axis of the anvil.

3. An anvil assembly according to claim 1, the cradle further comprising means for removably mounting the cradle onto a suitable support frame so as to enable a respective protruding peaked cutting edge, to be aligned with a horn of an ultrasonic cutting apparatus suitable mounted onto said frame.

4. An anvil assembly according to claim 1, further comprising a locking arrangement for positioning and releasably locking the anvil with respect to the cradle when mounted thereon in any one of the at least two mounting positions.

5. An anvil assembly according to claim 4, wherein the locking arrangement comprises at least one abutment member formed with a surface complementary to respective one or more surfaces of both the anvil and the cradle.

6. An anvil assembly according to claim 5, wherein surfaces of the at least one abutment member provide abutting contact with at least one surface of the anvil and at least one surface of the cradle, said surfaces extending in parallel relation along the longitudinal axis of the anvil.

7. An anvil assembly according to claim 5, wherein the one or more abutment member comprises at least one bolt extendable through at least one corresponding bore and at least one complementary substantially coaxial threaded bores made in the cradle.

8. An anvil assembly according to claim 1, wherein the engagement section corresponding to each position of the anvil comprises at least a first abutment surface and a second abutment surface angularly displaced one from another about the anvil's longitudinal axis.

9. An anvil assembly according to claim 8, wherein the complementary engagement means of the cradle comprises at least two surfaces angularly displaced one from another about the anvil's longitudinal axis so as to be in contact with corresponding abutment surfaces of the engagement section of the anvil.

10. An anvil assembly according to claim 9, wherein a first of said abutment surfaces and a second of said abutment surfaces comprise respective substantially planar surfaces angularly displaced one from another about said longitudinal axis of said anvil by a first angle.

11. An anvil assembly according to claim 1, wherein said complementary engagement means comprise respective substantially planar surfaces angularly displaced one from another about said longitudinal axis of anvil by a first angle.

12. An anvil assembly according to claim 1, wherein surfaces of the complementary engagement means provide a convex arrangement.

13. Anvil assembly according to claim 1, wherein the anvil has a rectangular cross-section.

14. An anvil assembly as claim 13, wherein said anvil comprises a substantially square transverse cross-section, wherein said cutting edges define the corners thereof.

15. An anvil assembly according to claim 1, wherein the anvil comprises four cutting edges respectively corresponding to four mounting positions; each cutting edge being angularly displaced about the longitudinal axis with respect to each adjacent cutting edge by about 90° wherein said engagement section comprises two surfaces corresponding to and extending from an opposed cutting edge.

16. An anvil assembly according to claim 1, wherein the complementary engagement means comprises a slot on an upper surface of the cradle, said surface being substantially parallel to the longitudinal axis of the cradle, said slot formed with substantially planar longitudinal surfaces.

17. An anvil assembly according to claim 16, wherein the planar longitudinal surfaces are disposed at about 45° with respect to the upper surface of the cradle.

18. An anvil assembly according to claim 1, wherein surfaces of the complementary engagement means provide a concave arrangement.

19. An anvil for use in an anvil assembly for an ultrasonic cutting apparatus, said anvil is adapted for selective cooperation with a horn operatively connected to an ultrasonic wave generator capable to impart to the horn reciprocating movement and to enable a textile workpiece disposed between said horn and said anvil to be cut and the cut edges to be sealed, said anvil assembly characterized in that:

said anvil is adapted to be indexably mountable onto a steady cradle in any one of at least two mounting positions, wherein corresponding to each mounting position said anvil comprises one peaked longitudinal rectilinear cutting edge and a corresponding engagement section substantially parallel to a longitudinal axis of the anvil; said corresponding engagement section is selectively engageable with a complementary engagement means formed in the cradle for enabling the anvil to be removably locked onto the cradle in a corresponding one of said at least two mounting positions such that the peaked edge corresponding to one of said at least two mounting positions protrudes from the cradle.

20. An anvil according to claim 19, wherein the engagement section is formed with one or more surfaces extending parallel to the longitudinal axis and bring engageable for abutment by one or more abutting brackets fixable to the cradle.

21. A steady cradle for use in an anvil assembly for an ultrasonic cutting apparatus, said cradle is adapted for selective cooperation with a horn operatively connected to an ultrasonic wave generator capable to impart to the horn reciprocating movement and to enable a textile workpiece disposed between said horn and said anvil to be cut and the cut edges to be sealed, said anvil assembly characterized in that:

said anvil is adapted to be selectively indexable onto the cradle in any one of at least two mounting positions, wherein corresponding to each mounting position said anvil comprises one peaked longitudinal rectilinear cutting edge and a corresponding engagement section substantially parallel to a longitudinal axis of the anvil; said corresponding engagement section is selectively engageable with a complementary engagement means formed in the cradle for enabling the anvil to be removably locked onto the cradle in a corresponding one of said at least two mounting positions such that the peaked edge corresponding to one of said at least two mounting positions protrudes from the cradle.

22. An anvil assembly for an ultrasonic cutting apparatus, said assembly comprising: a horn operatively connected to an ultrasonic wave generator capable to impart to the horn reciprocating movement, an anvil and a stationary cradle, said anvil being adapted to be indexably mountable onto the cradle in any one of at least two mounting positions, wherein said horn is adapted to selectively cooperate with the anvil so as to enable a textile workpiece disposed between said horn and said anvil to be cut and the cut edges to be sealed.

* * * * *